United States Patent
Qi et al.

(10) Patent No.: US 9,217,968 B2
(45) Date of Patent: *Dec. 22, 2015

(54) FUSER TOPCOATS COMPRISING SUPERHYDROPHOBIC NANO-FABRIC COATINGS

(75) Inventors: Yu Qi, Oakville (CA); Nan-Xing Hu, Oakville (CA); Qi Zhang, Mississauga (CA); Ed Zwartz, Mississauga (CA); Kurt Halfyard, Mississauga (CA); Brian Mcaneney, Burlington (CA); Gord Sisler, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 817 days.

This patent is subject to a terminal disclaimer.

(21) Appl. No.: 12/356,933

(22) Filed: Jan. 21, 2009

(65) Prior Publication Data

US 2010/0183864 A1    Jul. 22, 2010

(51) Int. Cl.
*B32B 3/26* (2006.01)
*G03G 15/20* (2006.01)
*B82Y 30/00* (2011.01)

(52) U.S. Cl.
CPC ............ *G03G 15/2057* (2013.01); *B82Y 30/00* (2013.01); *Y10T 428/24999* (2015.04); *Y10T 428/254* (2015.01)

(58) Field of Classification Search
CPC .............. B32B 3/26; B32B 5/16; B05D 3/02; G03G 15/2057; B82Y 30/00; Y10T 428/254; Y10T 428/24999
USPC .............. 442/76, 79; 428/357, 364, 365, 401, 428/319.1, 327; 427/385.5, 373
See application file for complete search history.

(56) References Cited

U.S. PATENT DOCUMENTS

| 4,842,944 A | 6/1989 | Kuge et al. |
| 5,187,849 A | 2/1993 | Kobayashi |

(Continued)

FOREIGN PATENT DOCUMENTS

| CN | 1892501 A | 1/2007 |
| EP | 1580514 A1 | 9/2008 |

(Continued)

OTHER PUBLICATIONS

PTFE Porous Membranes Product Specification, 2014, available at http://www.3dsro.sk/datasheet/classicfilters/051-Membranes.pdf.*

(Continued)

*Primary Examiner* — Jeremy R Pierce
(74) *Attorney, Agent, or Firm* — MH2 Technology Law Group LLP

(57) ABSTRACT

In accordance with the invention, there are image forming apparatuses, fusing subsystems, and methods of making a member of the fusing subsystems. The method of making a member of a fusing subsystem can include providing a fuser member, the fuser member including a substrate and providing a dispersion including a plurality of carbon nanotubes, a stabilizer, a hydrophobic polymer, and a solvent, wherein the plurality of carbon nanotubes is selected from the group consisting of single wall carbon nanotubes and multiple wall carbon nanotubes. The method can also include applying the dispersion over the substrate to form a coated substrate and heating the coated substrate to form a hydrophobic composite coating such that a top surface of the fuser member has a water contact angle of at least about 120°.

14 Claims, 4 Drawing Sheets

FIG. 3

(56) References Cited

U.S. PATENT DOCUMENTS

| | | | |
|---|---|---|---|
| 5,204,156 A | | 4/1993 | Lumb et al. |
| 5,485,259 A | * | 1/1996 | Uehara et al. ............... 399/325 |
| 5,547,759 A | | 8/1996 | Chen et al. |
| 5,649,273 A | | 7/1997 | Shimizu et al. |
| 5,788,770 A | * | 8/1998 | Hobson et al. ............... 118/244 |
| 5,846,643 A | | 12/1998 | Badesha et al. |
| 6,099,673 A | * | 8/2000 | Van Bennekom ............ 156/187 |
| 6,143,675 A | * | 11/2000 | McCollam et al. ........... 442/221 |
| 6,295,434 B1 | | 9/2001 | Chang et al. |
| 6,375,870 B1 | | 4/2002 | Visovsky et al. |
| 6,514,650 B1 | | 2/2003 | Schlueter, Jr. et al. |
| 6,664,336 B1 | | 12/2003 | Tomihashi et al. |
| 6,668,152 B1 | | 12/2003 | Jacob |
| 6,927,006 B2 | | 8/2005 | Finn et al. |
| 7,441,745 B2 | | 10/2008 | Kawaguchi et al. |
| 2002/0084553 A1 | | 7/2002 | Nun et al. |
| 2002/0136573 A1 | * | 9/2002 | Ogren et al. .................. 428/421 |
| 2002/0150723 A1 | | 10/2002 | Oles et al. |
| 2002/0197553 A1 | * | 12/2002 | Pickering et al. ............. 430/124 |
| 2003/0054155 A1 | | 3/2003 | Nomi et al. |
| 2006/0018026 A1 | | 1/2006 | Bastawros et al. |
| 2006/0156475 A1 | | 7/2006 | Oles et al. |
| 2006/0292360 A1 | | 12/2006 | Hays et al. |
| 2007/0031639 A1 | | 2/2007 | Hsu et al. |
| 2007/0120095 A1 | | 5/2007 | Gruner |
| 2007/0292660 A1 | | 12/2007 | Kikukawa |
| 2008/0152896 A1 | | 6/2008 | Moorlag et al. |
| 2008/0306202 A1 | | 12/2008 | Lin et al. |
| 2009/0016790 A1 | | 1/2009 | Funabiki |
| 2009/0123185 A1 | * | 5/2009 | Lin et al. ...................... 399/176 |
| 2009/0324308 A1 | | 12/2009 | Law et al. |
| 2010/0055450 A1 | | 3/2010 | Qi et al. |
| 2010/0137499 A1 | * | 6/2010 | Moorlag et al. ............... 524/496 |
| 2010/0184346 A1 | | 7/2010 | Qi et al. |
| 2011/0183114 A1 | | 7/2011 | Kim et al. |
| 2011/0183265 A1 | | 7/2011 | Kim et al. |

FOREIGN PATENT DOCUMENTS

| | | | | |
|---|---|---|---|---|
| JP | S629377 A | 1/1987 | | |
| JP | H0380277 A | 4/1991 | | |
| JP | 06186881 | 7/1994 | | |
| JP | H07191567 A | 7/1995 | | |
| JP | 11194640 A | 7/1999 | | |
| JP | 2004294049 A | 10/2004 | | |
| JP | 2005132919 A | 5/2005 | | |
| JP | 2005144751 A | 6/2005 | | |
| JP | 2006126595 A | 5/2006 | | |
| JP | 2007304374 A | 11/2007 | | |
| JP | 2008156646 A | 7/2008 | | |
| WO | WO 2004097853 A1 * | 11/2004 | ............... | H01B 1/24 |
| WO | 2007001405 A2 | 1/2007 | | |
| WO | 2007024206 A2 | 3/2007 | | |
| WO | 2008046166 A2 | 4/2008 | | |
| WO | 2008085550 | 7/2008 | | |

OTHER PUBLICATIONS

European Patent Office, European Search Report, European Application No. 10151211.9, Mar. 31, 2010, 3 Pages.

Communication issued by the Canadian Intellectual Property Office dated Jun. 12, 2013 for Canadian Patent Application No. 2,690,225, pp. 1-3.

First Office Action dated Apr. 17, 2013 (with English Translation) from Chinese Patent Application No. 201010001677.9, 13 Pages.

Kenneth K.S. Lau et al, "Superhydrophobic Carbon Nanotube Forests", Nano Letters, vol. 3, No. 12, Oct. 22, 2003, pp. 1701-1705.

Extended European Search Report dated Apr. 9, 2010, European Application No. 10150822.4 filed Jan. 15, 2010, pp. 1-9.

Ken-Ichi Tanuma, Summary of Japanese Office Action dated Mar. 25, 2014, Japanese Application No. 2010-009012 filed Jan. 19, 2010, pp. 1-3.

Toshihiro Tanimura, Summary of Japanese Office Action dated Jan. 28, 2014, Japanese Application No. 2010-009013 filed Jan. 19, 2010, pp. 1-4.

Wang et al., "Stable superhydrophobic composite coatings made from an aqueous dispersion of carbon nanotubes and a fluoropolymer", Carbon 49, 2011, pp. 1769-1774.

* cited by examiner

FUSER TOPCOATS COMPRISING SUPERHYDROPHOBIC NANO-FABRIC COATINGS

DESCRIPTION OF THE INVENTION

1. Field of the Invention

The present invention relates to printing devices and, more particularly, to oil-less fusing subsystems and methods of using them.

2. Background of the Invention

Competitive fusing products trends focus on oil-less fusing, energy-efficiency, fast warm up time (e.g. by inductive heating), belt configuration, reliability, and productivity. Currently, there are only a few material solutions that enable high demands for fusing, especially for oil-less fusing. Perfluoroalkoxy (PFA) and poly tetrafluoroethylene (PTFE) are most commonly used for oil-less fusing, whereas Viton-type fluoroelastomers are used for high end production fusing. Furthermore, fillers are frequently added to improve mechanical strength and thermal conductivity of the polymers. However, PFA has certain disadvantages, such as, mechanical rigidity; easy to be damaged; difficult to process requiring high curing temperature if coating method is used; and has limited room for material modification. On the other hand, Viton is mechanically flexible, is prone to less damage due to its capability to absorb shock energy, has low curing temp, and provides a wide material modification latitude. Nevertheless, Viton requires oil for releasing due to the low fluorine-content.

Accordingly, there is a need to provide materials with improved surface releasing property and mechanical robustness to enhance fuser performance.

SUMMARY OF THE INVENTION

In accordance with various embodiments, there is a fusing subsystem. The fusing subsystem can include a fuser member, the fuser member including a substrate and a top coat layer including a hydrophobic composite disposed over the substrate, wherein the hydrophobic composite can include a plurality of carbon nanotubes dispersed in a hydrophobic polymer, and wherein the hydrophobic composite has a water contact angle of least about 120°.

According to various embodiments, there is a method of making a member of a fusing subsystem. The method can include providing a fuser member, the fuser member including a substrate and providing a dispersion including a plurality of carbon nanotubes, a stabilizer, a hydrophobic polymer, and a solvent, wherein the plurality of carbon nanotubes is selected from the group consisting of single wall carbon nanotubes and multiple wall carbon nanotubes. The method can also include applying the dispersion over the substrate to form a coated substrate and heating the coated substrate to form a hydrophobic composite coating such that a top surface of the fuser member has a water contact angle of at least about 120°.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

As used herein, the terms "hydrophobic" and "hydrophobicity" refer to the wettability of a surface (e.g., a coating surface) that has a water contact angle of approximately 90° or more and the terms "superhydrophobic" and "superhydrophobicity" refer to the wettability of a surface (e.g., a coating surface) that has a water contact angle of approximately 150° or more and very low contact angle hysteresis ($\Delta\theta=\theta_A-\theta_B<1$).

Figure 1:
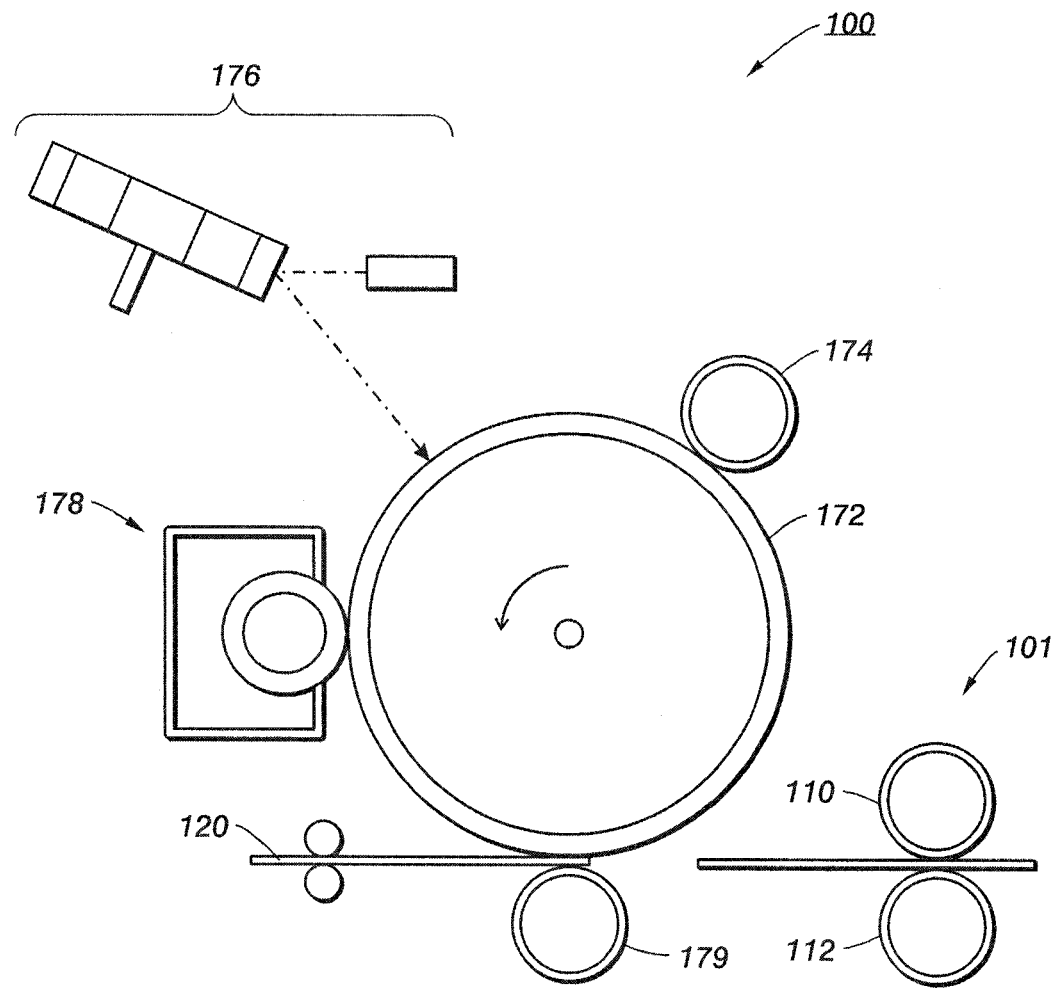
FIG. 1 schematically illustrates an exemplary printing apparatus, according to various embodiments of the present teachings.
Figure 4:
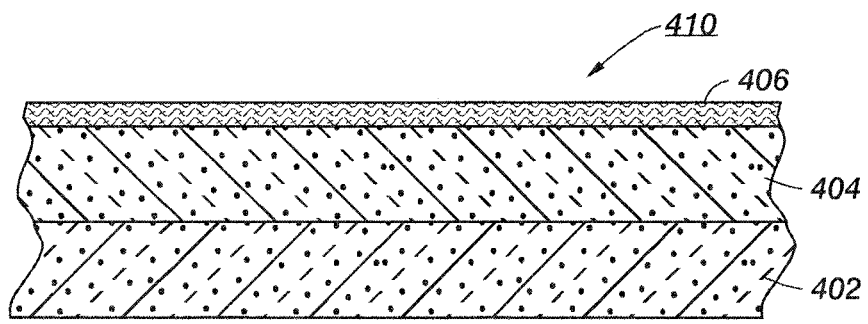
FIG. 4 schematically illustrates a cross section of another exemplary fuser member, according to various embodiments of the present teachings.

FIG. 1 schematically illustrates an exemplary printing apparatus 100. The exemplary printing apparatus 100 can include an electrophotographic photoreceptor 172 and a charging station 174 for uniformly charging the electrophotographic photoreceptor 172. The electrophotographic photoreceptor 172 can be a drum photoreceptor as shown in FIG. 1 or a belt photoreceptor (not shown). The exemplary printing apparatus 100 can also include an imaging station 176 where an original document (not shown) can be exposed to a light source (also not shown) for forming a latent image on the electrophotographic photoreceptor 172. The exemplary printing apparatus 100 can further include a development subsystem 178 for converting the latent image to a visible image on the electrophotographic photoreceptor 172 and a transfer subsystem 179 for transferring the visible image onto a media 120. The printing apparatus 100 can also include a fusing subsystem 101 for fixing the visible image onto the media 120. The fusing subsystem 101 can include one or more of a fuser member 110, a pressure member 112, oiling subsystems (not shown), and a cleaning web (not shown), wherein the fuser member and/or the pressure member 112 can have a top coat layer including a hydrophobic composite in a form of a nano-fabric. In some embodiments, the fuser member 110 can be a fuser roll 110, as shown in FIG. 1. In other embodiments, the fuser member 110 can be a fuser belt, 415, as shown in FIG. 4. In various embodiments, the pressure member 112 can be a pressure roll 112, as shown in FIG. 1 or a pressure belt (not shown).

Figure 2:
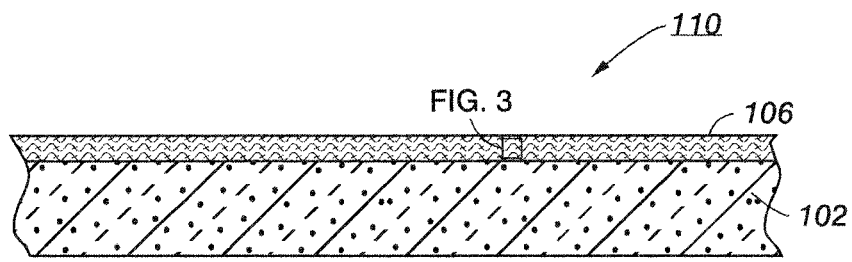
FIG. 2 schematically illustrates a cross section of an exemplary fuser member shown in FIG. 1, according to various embodiments of the present teachings.

Referring back to the fuser member 110, FIG. 2 schematically illustrates a cross section of an exemplary fuser member 110. In various embodiments, the exemplary fuser member 110 can include a top coat layer 106 including a hydrophobic composite disposed over a substrate 102. In various embodiments, the hydrophobic composite can include a plurality of carbon nanotubes dispersed in a hydrophobic polymer. In certain embodiments, the top coat layer 106 including the hydrophobic composite can have a contact angle of about 120° or greater when measured with water. In some cases, the top coat layer 106 can have a thickness from about 50 nm to about 300 μm and in other cases, the top coat layer 106 can have a thickness from about 3 μm to about 80 μm.

Figure 3:
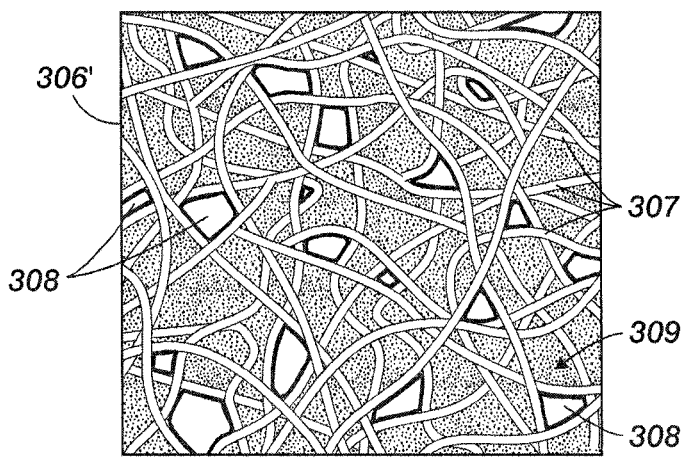
FIG. 3 schematically illustrates an exemplary hydrophobic composite, according to various embodiments of the present teachings.

FIG. 3 is a schematic illustration of an exemplary hydrophobic composite coating 306' including a plurality of carbon nanotubes 307 dispersed in the hydrophobic polymer 309. In some embodiments, the hydrophobic composite coating 306' can include a porous nano-fabric with a plurality of pores 308, as shown in FIG. 3. The plurality of pores 308 can be filled with any suitable material, such as, for example, air, a hydrophobic polymer, and a mixture thereof. In some cases, the pore size can range from about 0.01 μm to about 10 μm and in other cases from about 0.025 μm to about 3 μm. In some embodiments, the carbon nanotubes 307 can be physically bonded to the hydrophobic polymer 309. In other embodiments, the carbon nanotubes 307 can be chemically bonded to the hydrophobic polymer 309. The term "chemical bonding", as used herein, refers to covalent bonding and/or ionic bonding formed as a result of chemical reaction between the carbon nanotubes 307 and the hydrophobic polymer 309. The term "physical bonding", as used herein, refers to any kind of bonding besides chemical bonding, such as, for example, hydrogen bonding, van der Waals interaction.

In various embodiments, the plurality of carbon nanotubes 307 can include one or more of a plurality of single-walled carbon nanotubes (SWNT) and a plurality of multi-walled carbon nanotubes (MWNT). In some embodiments, carbon nanotubes can be one or more of semiconducting carbon nanotubes and metallic carbon nanotubes. In certain embodiments, each of the plurality of carbon nanotubes 307 can have an aspect ratio of at least about 10. However, the carbon nanotubes can be of different lengths, diameters, and/or chiralities. The carbon nanotubes can have a diameter from about 0.5 nm to about 50 nm and length from about 100 nm to a few mm. In some cases, the carbon nanotubes 307 can be present in an amount of from about 5 to about 95 percent by weight of the total solid weight of the hydrophobic composite coating 306' and in other cases from about 10 to about 90 percent by weight of the total solid weight of the hydrophobic composite coating 306'.

In some embodiments, the hydrophobic polymer 309 can include silicones, polyperfluoropolyethers, or a polymer having one or more monomer repeat units selected from the group consisting of ethylene, propylene, a styrene, tetrafluoroethylene, vinylidene fluoride, hexafluoropropylene, perfluoro(methyl vinyl ether), perfluoro(propyl vinyl ether), perfluoro(ethyl vinyl ether), and the mixtures thereof. In other embodiments, the hydrophobic polymer 309 can include a fluoropolymer having one or more monomer repeat units selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and the mixtures thereof. Exemplary hydrophobic polymer 309 can include, but is not limited to, polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

In various embodiments, the hydrophobic composite coating 306' can have an electrical surface resistivity of less than about 1000 Ω/sq.

FIG. 4 schematically illustrates a cross section of another exemplary fuser member 410. The exemplary fuser member 410 can include a compliant layer 404 disposed over a substrate 402 and a top coat layer 406 including a hydrophobic composite 306' disposed over the compliant layer 404. In various embodiments, the compliant layer 404 can include at least one of a silicone, a fluorosilicone, or a fluorelastomer. Exemplary material for the compliant layer can include, but is not limited to, silicone rubbers such as room temperature vulcanization (RTV) silicone rubbers; high temperature vulcanization (HTV) silicone rubbers; and low temperature vulcanization (LTV) silicone rubbers. Exemplary commercially available silicone rubbers include, but are not limited to, SILASTIC® 735 black RN and SILASTIC® 732 RTV (Dow Corning Corp., Midland, Mich.); and 106 RTV Silicone Rubber and 90 RN Silicone Rubber (General Electric, Albany, N.Y.). Other suitable silicone materials include, but are not limited to, Sylgard® 182 (Dow Corning Corp., Midland, Mich.). siloxanes (preferably polydimethylsiloxanes); fluorosilicones such as Silicone Rubber 552 (Sampson Coatings, Richmond, Va.); dimethylsilicones; liquid silicone rubbers such as, vinyl crosslinked heat curable rubbers or silanol room temperature crosslinked materials; and the like. In some cases, the compliant layer 404 can have a thickness from about 10 μm to about 10 mm and in other cases from about 3 mm to about 8 mm.

Referring back to the fuser member 110, 410 as shown in FIGS. 1, 2, 4, the substrate 102, 402 can be a high temperature plastic substrate, such as, for example, polyimide, polyphenylene sulfide, polyamide imide, polyketone, polyphthalamide, polyetheretherketone (PEEK), polyethersulfone, polyetherimide, and polyaryletherketone. In other embodiments, the substrate 102, 402 can be a metal substrate, such as, for example, steel and aluminum. The substrate 102, 402 can have any suitable shape such as, for example, a cylinder and a belt. The thickness of the substrate 102, 402 in a belt configuration can be from about 50 μm to about 300 μm, and in some cases from about 50 μm to about 100 μm. The thickness of the substrate 102, 402 in a cylinder or a roll configuration can be from about 2 mm to about 20 mm, and in some cases from about 3 mm to about 10 mm.

In various embodiments, the fuser member 110, 410 can also include one or more optional adhesive layers (not shown); the optional adhesive layers (not shown) can be disposed between the substrate 402 and the compliant layer 404 and/or between the compliant layer 404 and the top coat layer 406 and/or between the substrate 102 and the top coat layer 106 to ensure that each layer 106, 404, 406 is bonded properly to each other and to meet performance target. Exemplary materials for the optional adhesive layer can include, but are not limited to epoxy resins and polysiloxanes.

Referring back to the printing apparatus 100, the printing apparatus 100 can be a xerographic printer, as shown in FIG. 1. In certain embodiments, the printing apparatus 100 can be an inkjet printer (not shown).

Figure 5:
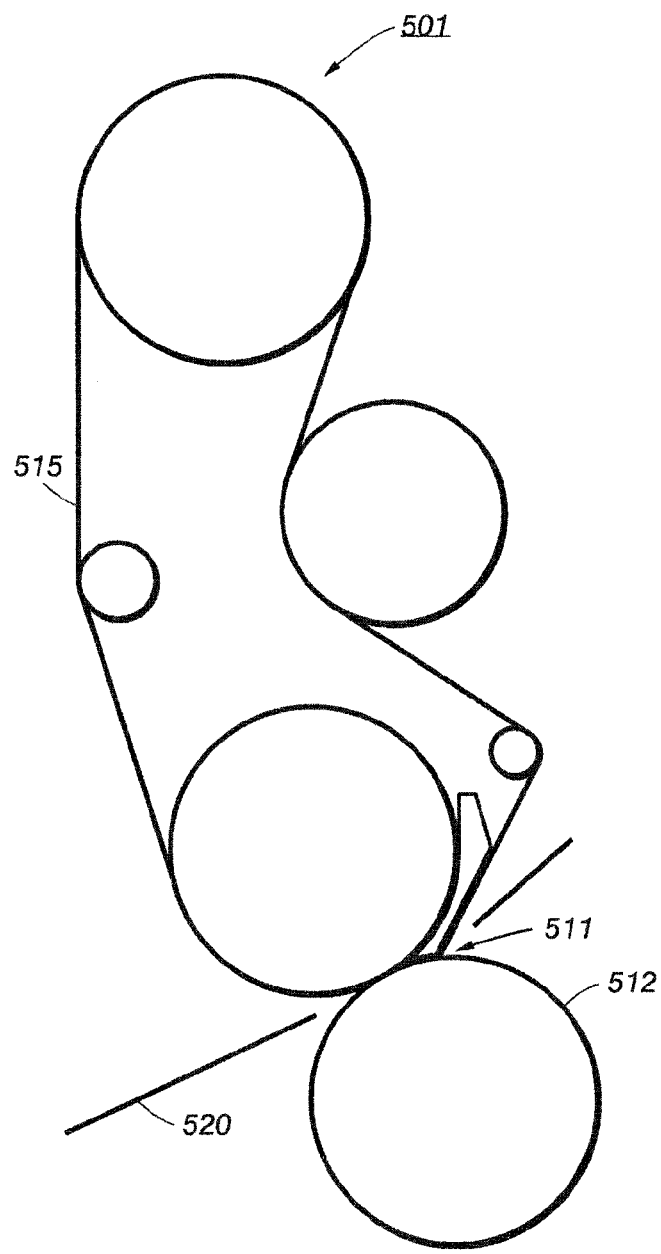
FIG. 5 schematically illustrates an exemplary fusing subsystem of a printing apparatus, according to various embodiments of the present teachings.

FIG. 5 schematically illustrates an exemplary fusing subsystem 501 in a belt configuration of a xerographic printer. The exemplary fusing subsystem 501 can include a fuser belt 515 and a rotatable pressure roll 512 that can be mounted forming a fusing nip 511. In various embodiments, the fuser belt 515 and the pressure roll 512 can include a top coat layer 106, 406 including hydrophobic composite 306' disposed over a substrate 102 as shown in FIG. 2 or over a compliant layer 404, as shown in FIG. 4, such that the top coat layer 106, 406 can have a contact angle of about 120° or greater when measured with water. A media 520 carrying an unfused toner image can be fed through the fusing nip 511 for fusing.

The disclosed exemplary top coat layer 106, 406 of the fuser member 110, 410, 515 including a hydrophobic composite 306' possesses the low surface energy and chemical inertness of the hydrophobic polymers, needed for oil-less fusing. Furthermore, the exemplary top coat layer 106, 406 combines the mechanical, electrical, and thermal properties of the carbon nanotubes with the inertness of hydrophobic polymers, desired for long life of the fuser members 110, 410, 515. Additionally, the top coat layer 106, 406 can be formed using simple techniques, such as, for example, spray coating, dip coating, brush coating, roller coating, spin coating, casting, and flow coating.

In various embodiments, the pressure members 112, 512, as shown in FIGS. 1 and 5 can also have a cross section as shown in FIGS. 2 and 4 of the exemplary fuser member 110, 410.

Figure 6:
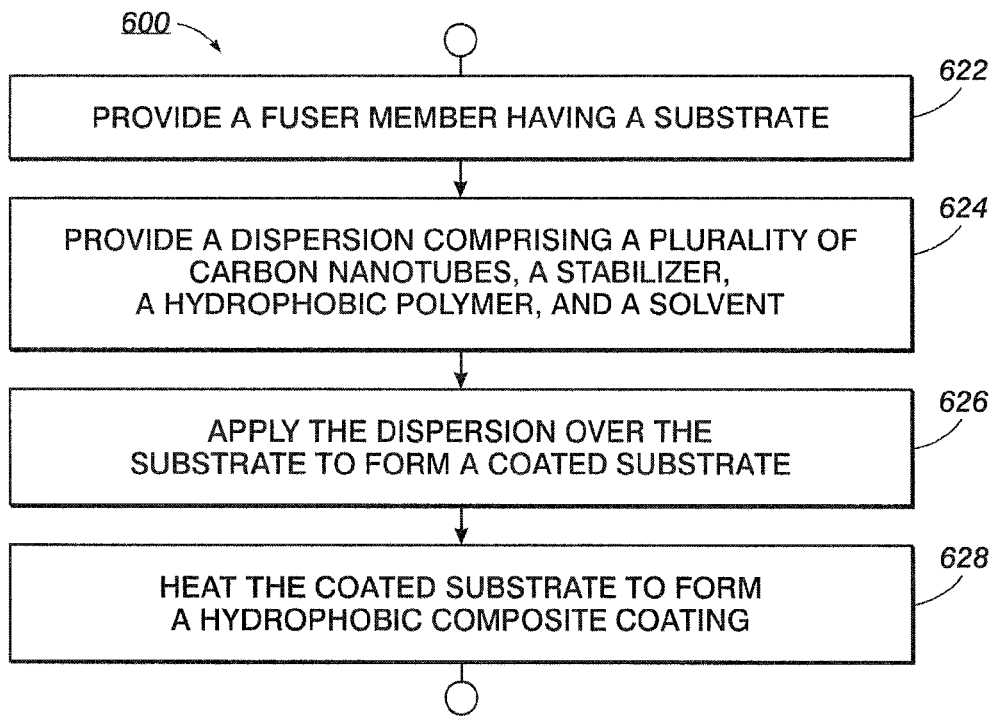
FIG. 6 shows an exemplary method of making a member of a fusing subsystem, according to various embodiments of the present teachings.

FIG. 6 schematically illustrates an exemplary method 600 of making a member of a fusing subsystem. The method 600 can include a step 622 of providing a fuser member, the fuser member including a substrate and a step 624 of providing a dispersion including a plurality of carbon nanotubes, a stabilizer, a hydrophobic polymer, and a solvent. The plurality of carbon nanotubes can be one or more of a plurality of single wall carbon nanotubes and a plurality of multiple wall carbon nanotubes, and wherein each of the plurality of carbon nanotubes can have an aspect ratio of at least about 10. Any suitable stabilizer can be used, such as, for example, a polymeric amine, a polymeric amine salt, a polymeric acid, a conjugated polymer, and a natural gum material. Exemplary stabilizer can include, but is not limited to polyallylamine, polyethylenimine, poly(diallyldimethylammonium chloride), poly(allylamine hydrochloride), and mixtures thereof; poly(acrylic acid), poly(3,4-ethylenedioxythiophene), poly (3,4-ethylenedioxythiophene) complexes with a polymeric acid, Gum Arobic, chitosan, and mixtures thereof. In various embodiments, the hydrophobic polymer can include one or more of silicones, polyperfluoropolyethers, and a polymer having one or more monomer repeat units selected from the group consisting of ethylene, propylene, a styrene, tetrafluoroethylene, vinylidene fluoride, hexafluoropropylene, perfluoro(methyl vinyl ether), perfluoro(ethyl vinyl ether), and perfluoro(propyl vinyl ether). Exemplary hydrophobic polymer can include, but is not limited to, polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TEE), vinylidene fluoride (VDF), and hexafluoropropylene (HFP); and tetrapolymers of tetrafluoroethylene (TFE), vinylidene fluoride (VF2), and hexafluoropropylene (HFP). In some cases, the hydrophobic polymer can be a colloid. In other cases, the hydrophobic polymer can be a latex. Yet, in some other cases, the hydrophobic polymer can be a suspension. Any suitable solvent can be used, including, but not limited to water, an alcohol, a $C_5$-$C_{18}$ aliphatic hydrocarbon, a $C_6$-$C_{18}$ aromatic hydrocarbon, an ether, a ketone, an amide, and the mixtures thereof.

The method 600 of making a member of a fusing subsystem can further include a step 626 of applying the dispersion over the substrate to form a coated substrate. Any suitable technique can be used for applying the dispersion to the one region of the substrate, such as, for example, spray coating, dip coating, brush coating, roller coating, spin coating, casting, and flow coating. In certain embodiments, the step 626 of applying the dispersion over the substrate to form a coated substrate can include forming a compliant layer over the substrate and applying the dispersion over the compliant layer to form a coated substrate. Any suitable material can be used to form the compliant layer, including, but not limited to, silicones, fluorosilicones, and a fluoroelastomers.

The method 600 can also include a step 628 of heating the coated substrate at a temperature in the range of about 20° C. to about 400° C. to form a hydrophobic composite coating in a form of nano-fabric, wherein the hydrophobic composite coating can have a water contact angle about 120° or more. While not bound by any theory, it is also believed that the stabilizer and the solvent either evaporate or disintegrate during the heating and/or drying process, leaving only the carbon nanotubes and the hydrophobic polymer in the hydrophobic composite coating. In various embodiments, the hydrophobic composite coating can include a plurality of pores with an average pore size ranging from about 0.1 μm to about 5 μm.

Figure 7:
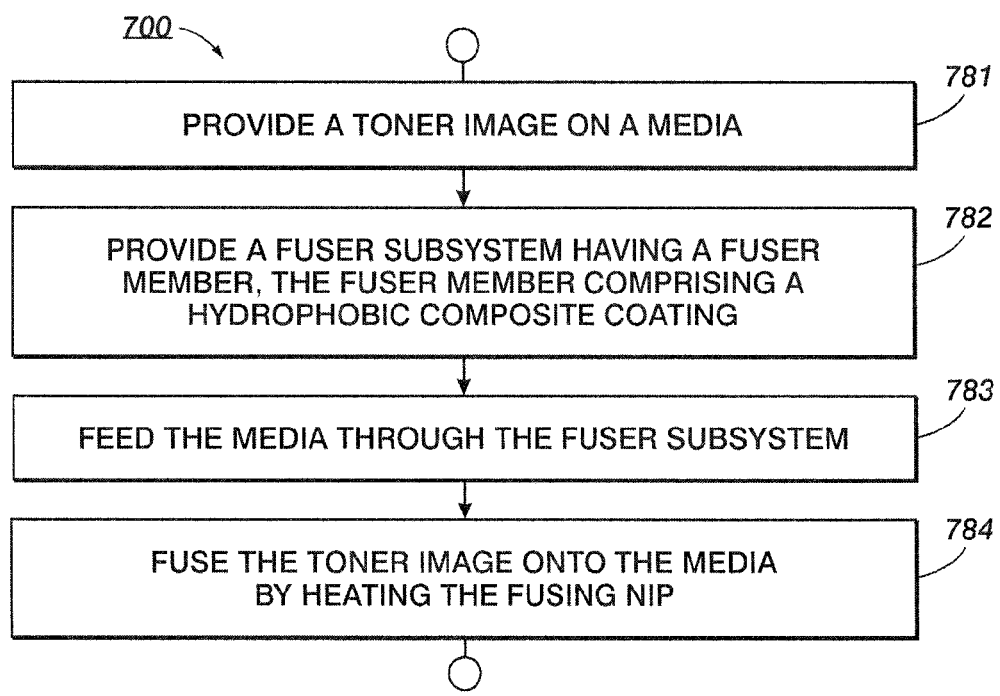
FIG. 7 shows an exemplary method of forming an image, according to various embodiments of the present teachings.

FIG. 7 shows an exemplary method 700 of forming an image, according to various embodiments of the present teachings. The method 700 can include providing a toner image on a media, as in step 781. The method 700 can also include a step 782 of providing a fusing subsystem including a fuser member, wherein the fuser member can include a top coat layer including a hydrophobic composite in a nano-fabric form disposed over a substrate, wherein the hydrophobic composite can include a plurality of carbon nanotubes dispersed in a hydrophobic polymer. In various embodiments, the top coat layer can have a water contact angle of least about 120°. In some embodiments, the step 682 of providing a fusing subsystem can include providing the fusing subsystem in a roller configuration. In other embodiments, the step 782 of providing a fusing subsystem can include providing the fusing subsystem in a belt configuration. In various embodiments, the fuser member of the fusing subsystem can include one or more of a fuser roll, a fuser belt, a pressure roll, a pressure belt. The method 700 can further include a step 783 of feeding the media through the fusing subsystem, such that the toner image on the media contacts the top coat layer of the fuser member in a fusing nip and a step 784 of fusing the toner image onto the media by heating the fusing nip.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Preparation of a CNT Aqueous Dispersion

About 1 weight % poly(allylamine) solution was formed by dissolving about 10 g of about 20 weight % poly(allylamine) aqueous solution in about 117 g of water and 3 g of 6N hydrochloric acid solution. A carbon nanotube (CNT) aqueous dispersion was formed by adding about 1 g (about 1 part) of multi-walled carbon nanotubes (CNT) to about 99 g (about 99 parts) of poly(allylamine) solution and sonicating the solution using a probe sonicator for about 10 times with a duration of about 1 minute each time. The resulting CNT aqueous dispersion had an average particle size of about 250 nm, as measured by a particle analyzer (Nanotrac 252, Microtrac Inc., North Largo, Fla.).

Example 2

Preparation of a Coating Dispersion

About 0.167 g of about 60 wt % perfluoroaloxy polymer (PFA) dispersion obtained from DuPont was mixed with about 10 g of CNT aqueous dispersion of Example 1 and the resulting coating dispersion was roll-milled for about 2 minutes on a rotator Movil-Rod (Eberbach Corp., Ann Arbor, Mich.).

Example 3

Formation of a Fuser Member

The coating dispersion of Example 2 was spray coated on a segmented primer-coated silicone rubber rolls and the resulting top coat layer was baked at about 350° C. for about 20 minutes followed by 360° C. for about 10 minutes. The top coat layer was uniform and had no cracks. The top coat layer was found to have a thickness of about 10 µm. The scanning electron microscopy (SEM) of the coated silicon showed that carbon nanotubes (CNT) were uniformly distributed in the hydrophobic composite coating. The water contact angle was measured to be about 150°. Further experiments showed that the water contact angles (WCA) of the hydrophobic composite coating increased with the increase in the CNT concentration, reaching about 150° at about 50% CNT loading.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fusing subsystem comprising:
a fuser member, the fuser member comprising:
a substrate; and
a top coat layer comprising a superhydrophobic composite disposed over the substrate, wherein the superhydrophobic composite has a water contact angle of at least about 150° and comprises a plurality of carbon nanotubes dispersed in a hydrophobic perfluoroalkoxy polymer resin, a loading of the carbon nanotubes ranging from about 50% to about 95% by weight of the total solid weight of the superhydrophobic composite, the superhydrophobic composite comprising a plurality of pores filled with air and having an average size ranging from about 0.025 µm to about 3 µm, wherein the top coat layer has a thickness from about 50 nm to about 80 µm, and
wherein the fuser member is selected from the group consisting of a fuser roll, a fuser belt, a pressure roll, a pressure belt, a transfix roll and a transfix belt.

2. The fusing subsystem of claim 1, wherein the plurality of carbon nanotubes are disposed in a form of a fabric network.

3. The fusing subsystem of claim 1, wherein the carbon nanotubes are physically or chemically bonded to the hydrophobic polymer.

4. The fusing subsystem of claim 1, wherein the plurality of carbon nanotubes is selected from the group consisting of single wall carbon nanotubes and multiple wall carbon nanotubes, and wherein each of the plurality of carbon nanotubes has an aspect ratio of at least about 10.

5. The fusing subsystem of claim 1, wherein the top coat layer has an electrical surface resistivity of less than about 1000 Ω/sq.

6. The fusing subsystem of claim 1, wherein the fuser member further comprises;
a compliant layer disposed over the substrate; and
the top coat layer comprising a superhydrophobic composite disposed over the compliant layer.

7. A method of making a member of a fusing subsystem, the method comprising:
providing a fuser member, the fuser member comprising a substrate;
providing a dispersion comprising a plurality of carbon nanotubes, a stabilizer, a hydrophobic perfluoroalkoxy polymer, and a solvent, wherein the plurality of carbon nanotubes is selected from the group consisting of single wall carbon nanotubes and multiple wall carbon nanotubes;

applying the dispersion over the substrate to form a coated substrate; and heating the coated substrate to form a superhydrophobic composite coating having a loading of the carbon nanotubes ranging from about 50% to about 95% by weight of the total solid weight of the superhydrophobic composite coating, wherein the superhydrophobic composite coating has a thickness from about 50 nm to about 80 µm, and wherein the superhydrophobic composite coating comprises a plurality of pores filled with air and having an average size ranging from about 0.025 µm to about 3 µm, wherein the superhydrophobic composite coating has a water contact angle of at least about 150°; and wherein the fuser member is selected from the group consisting of a fuser roll, a fuser belt, a pressure roll, a pressure belt, a transfix roll and a transfix belt.

8. The method of making a member of a fusing subsystem according to claim 7, wherein the stabilizer is selected from the group consisting of a polymeric amine, a polymeric amine salt, a polymeric acid, a conjugated polymer, and a natural gum material.

9. The method of making a member of a fusing subsystem according to claim 7, wherein the hydrophobic polymer is one or more of colloid, latex, and suspension.

10. The method of making a member of a fusing subsystem according to claim 7, wherein the solvent is selected from the group consisting of water, an alcohol, a $C_5$-$C_{18}$ aliphatic hydrocarbon, a $C_6$-$C_{18}$ aromatic hydrocarbon, an ether, a ketone, an amide, and mixtures thereof.

11. The method of making a member of a fusing subsystem according to claim 7, wherein the step of applying the dispersion over the substrate to form a coated substrate comprises:

forming a compliant layer over the substrate, wherein the compliant layer comprises at least one of a silicone, a fluorosilicone, or a fluoroelastomer; and applying the dispersion over the compliant layer to form a coated substrate.

12. The method of making a member of a fusing subsystem according to claim 7, wherein the step of applying the dispersion to at least one surface of the substrate to form a coated substrate comprises an application technique selected from the group consisting of spray coating, dip coating, brush coating, roller coating, spin coating, casting, and flow coating.

13. The method of making a member of a fusing subsystem according to claim 7, wherein the stabilizer is poly(acrylic acid).

14. A fusing subsystem comprising:
a fuser member, the fuser member comprising:
a substrate; and
a top coat layer comprising a superhydrophobic composite disposed over the substrate, wherein the superhydrophobic composite has a water contact angle of at least about 150° and comprises a plurality of carbon nanotubes dispersed in a hydrophobic perfluoroalkoxy polymer resin, a loading of the carbon nanotubes ranging from about 50% to about 95% by weight of the total solid weight of the superhydrophobic composite, the superhydrophobic composite comprising a plurality of pores filled with air and having an average size ranging from about 0.025 µm to about 3 µm, wherein the top coat layer has a thickness from about 50 nm to about 10 µm, and wherein the fuser member is selected from the group consisting of a fuser roll, a fuser belt, a pressure roll, a pressure belt, a transfix roll and a transfix belt.

\* \* \* \* \*